July 21, 1942. C. J. WESTLING 2,290,397
REDUCTION FURNACE
Filed Jan. 25, 1941 5 Sheets-Sheet 1

INVENTOR
CARL J. WESTLING
BY
ATTORNEYS

July 21, 1942. C. J. WESTLING 2,290,397
REDUCTION FURNACE
Filed Jan. 25, 1941 5 Sheets-Sheet 3

INVENTOR
CARL J. WESTLING
BY
ATTORNEYS

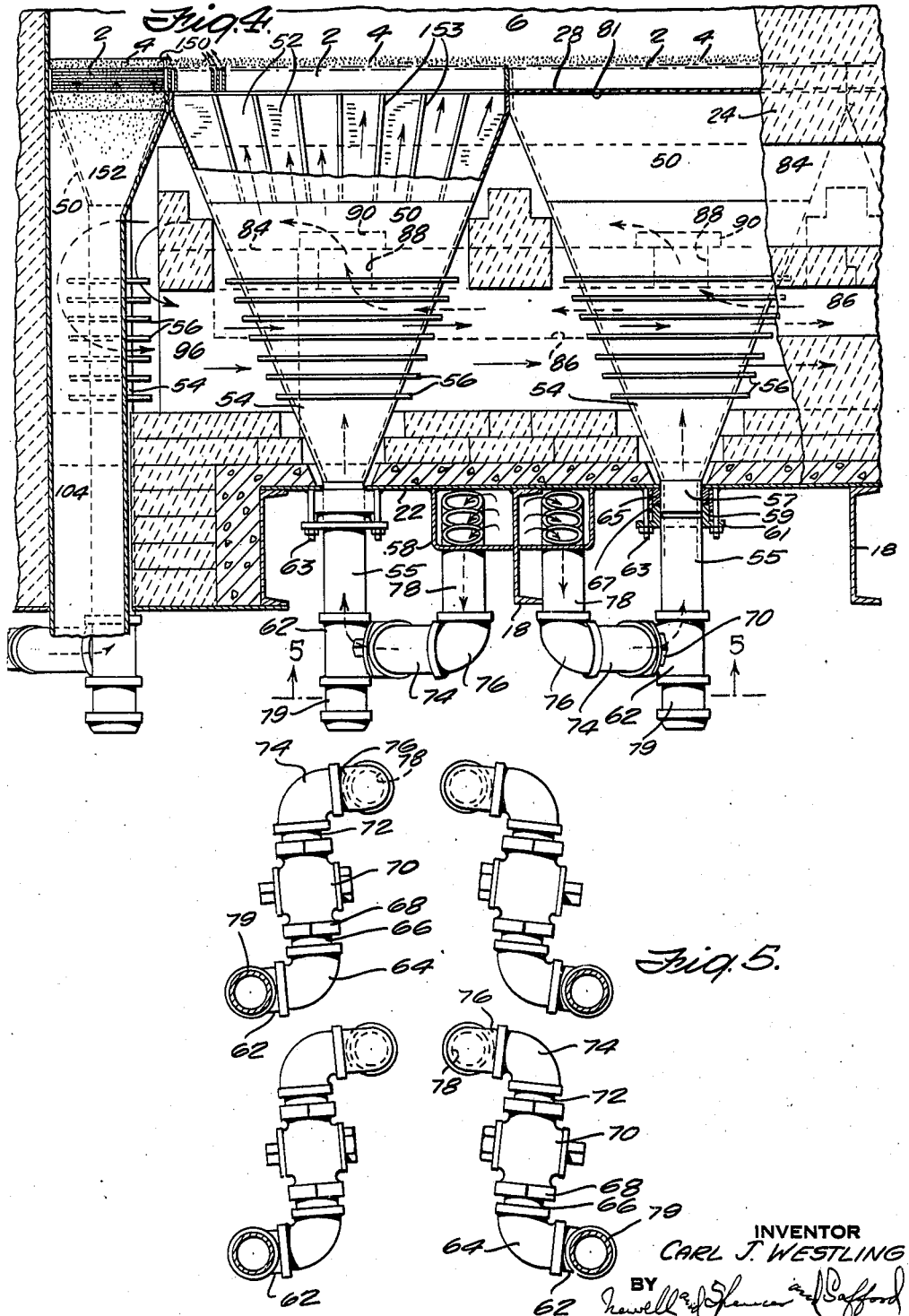

July 21, 1942.  C. J. WESTLING  2,290,397
REDUCTION FURNACE
Filed Jan. 25, 1941    5 Sheets-Sheet 5
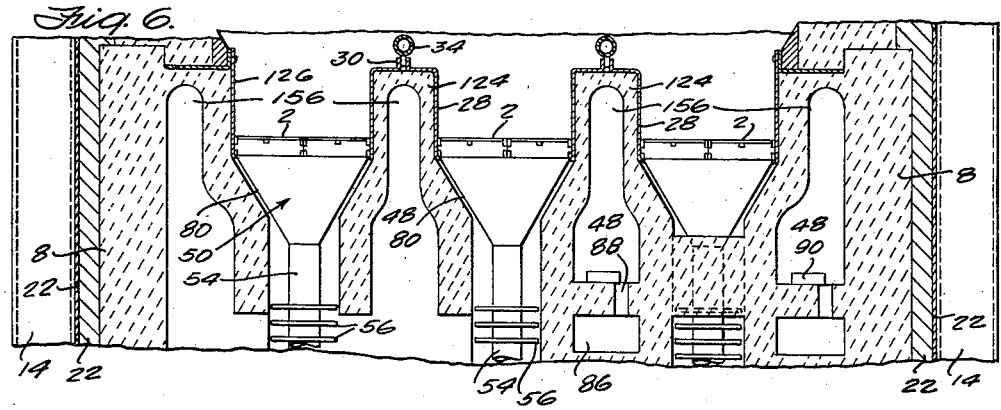
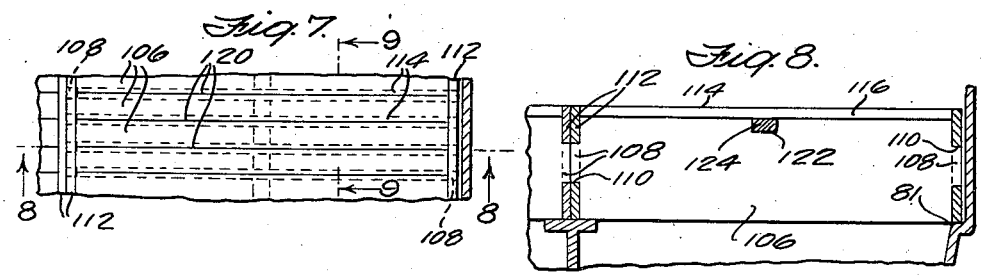
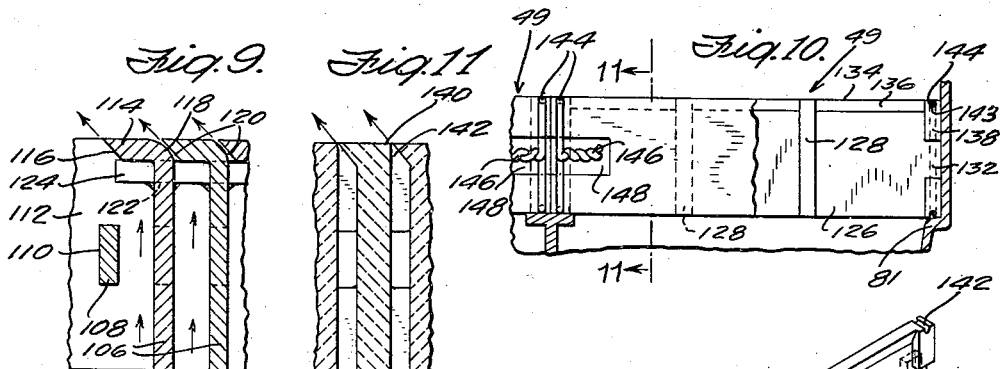
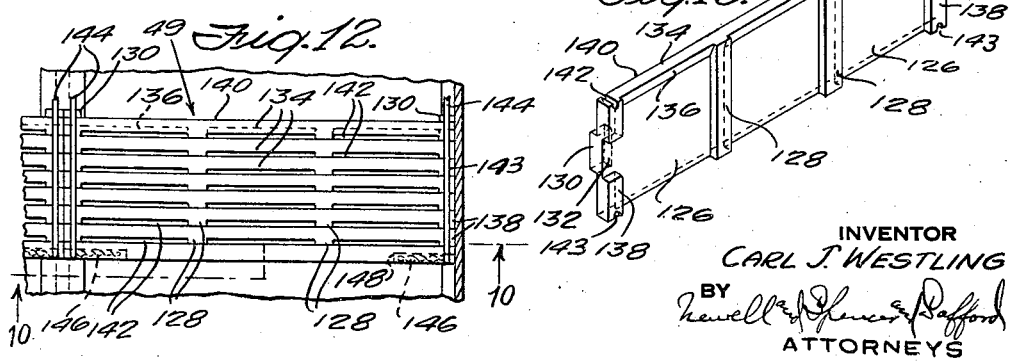
INVENTOR
CARL J. WESTLING
BY
ATTORNEYS Patented July 21, 1942

2,290,397

UNITED STATES PATENT OFFICE 2,290,397

REDUCTION FURNACE

Carl J. Westling, West Orange, N. J., assignor to Minerals and Metals Corporation, New York, N. Y., a corporation of Delaware Application January 25, 1941, Serial No. 375,883

11 Claims. (Cl. 266—24)

This invention relates to furnaces for use in the reduction of ores or other metallic compounds, and particularly to furnaces designed for use in the reduction of finely divided ores or other metallic compounds at temperatures below the fusion temperatures of the metals to be recovered.

A general object of the present invention is to provide a reduction furnace in which the parts are so constructed and arranged that direct and substantially complete reduction of finely divided ores or other metallic compounds may be carried on substantially continuously and on a commercial scale. More particularly the invention aims to provide a reduction furnace in which the novel processes of effecting direct reduction of finely divided ores, such as finely divided iron ores, which are described and claimed in the co-pending applications of James C. Hartley, Serial No. 338,560, filed June 3, 1940, and of Herman A. Brassert and James C. Hartley, Serial No. 360,418, filed October 9, 1940, may be practiced on a commercial scale.

When practicing the novel processes of the applications hereinabove identified, in which reduction is effected at temperatures below the fusion temperature of the ore constituents and, in the case of iron ores, preferably at temperatures above those at which pyrophoric iron is formed, care must, of course, be taken that marked variations in temperature shall not take place, particularly such variations as might result in interference with the movements of the ore or other mechanical functions of the apparatus. The present invention aims, therefore, to provide a reduction furnace in which the desired physical conditions requisite to the successful practice of the processes of said copending applications may readily be obtained and maintained.

The invention aims further to provide a furnace construction in which interference with the operation which may come about from accidental causes may readily be rectified and in which parts subject to wear or other deterioration can readily be repaired or replaced.

In practicing the process of producing primary solids from directly reduced iron powder while still in its nascent state, which forms the subject-matter of the application of Herman A. Brassert, Serial No. 369,053, filed December 7, 1940, it is important, where commercial production is desired and also uniform quality of the product, not only that sufficient directly reduced iron powder be supplied from the reduction furnace to permit efficient operation of the process, but that this powder be supplied at a substantially constant temperature and that the temperature of the powder be substantially uniform throughout the mass. An important object of the present invention is to provide a reduction furnace which can be operated to meet these conditions.

To this end the invention aims to provide a reduction furnace having sufficient capacity for supplying directly reduced finely divided iron powder in quantities sufficient to permit the operation of apparatus for practicing the process of the application Serial No. 369,053, hereinabove identified, on a commercial scale and at the same time to deliver the said reduced finely divided iron powder to the apparatus employed in practicing the process in the desired uniformly heated condition and of the desired uniformly reduced quality.

An important feature of the invention is the novel hearth construction employed in the furnace, this hearth being of the jet orifice type of the above-identified co-pending applications Serial No. 338,560 and Serial No. 360,418, but being made up of a plurality of removable sections whereby repair and maintenance of the hearth are facilitated. Another important feature of the invention is the construction and arrangement of the manifolds for supplying reducing gases to the jet orifices of the hearth, having regard particularly to the removability of the hearth sections. Still another important feature of the invention is the provision of combustion flues so arranged in the furnace structure that the combustion of fuel in said flues supplies some of heat for the reduction operation by conduction through the walls of said flues and the provision of other flues, into which the jet orifice manifolds project, through which the hot gaseous products of the combustion pass before being discharged from the furnace, whereby effective preheating of the reducing gases is effected. Another important feature is the design and construction of the manifolds to insure the desired heat exchange between the gaseous products of the combustion and the reducing gases.

Other important features of the invention are the arrangement of the hearths to effect delivery of the reduced or partially reduced ore into a common chute which is constructed and arranged to deliver the reduced or partially reduced ore directly to the apparatus for effecting consolidation thereof, the ready removability of the reducing gas manifolds for cleaning, repair or replacement and the provision of water-cooled supports and guides for tools which may occasionally be required to effect manipulation of the charge during operation of the furnace.

Still other objects and important features of the invention will appear from the following description and claims when considered in connection with the accompanying drawings, in which:

Figure 4 is a section on the line 4—4 of Figure 3;

Figure 5 is a section on the line 5—5 of Figure 4, showing the arrangement of the connecting pipes and valves for the reducing gas;

Figure 6 is a sectional detail, similar to Figure 3, showing a modification of the construction and arrangement of the combustion chambers;

Figure 7 is a plan detail of a portion of a hearth made up of metallic members, this figure illustrating the construction and arrangement of the individual members which go to make up the removable sections of the hearth construction;

Figure 8 is a section on the line 8—8 of Figure 7;

Figure 9 is a section on the line 9—9 of Figure 7;

Figure 10 is a section on the line 10—10 of Figure 12, the hearth shown in Figure 12 being made up of refractory tiles;

Figure 11 is a section on the line 11—11 of Figure 10;

Figure 12 is a plan view of a hearth made up of refractory tiles, this view illustrating particularly the method of and means for tying together the tiles which make up a removable hearth section;

Figure 13 is a perspective view of one of the individual tiles which go to make up the removable hearth sections of the type shown in Figure 12.

Figure 1:
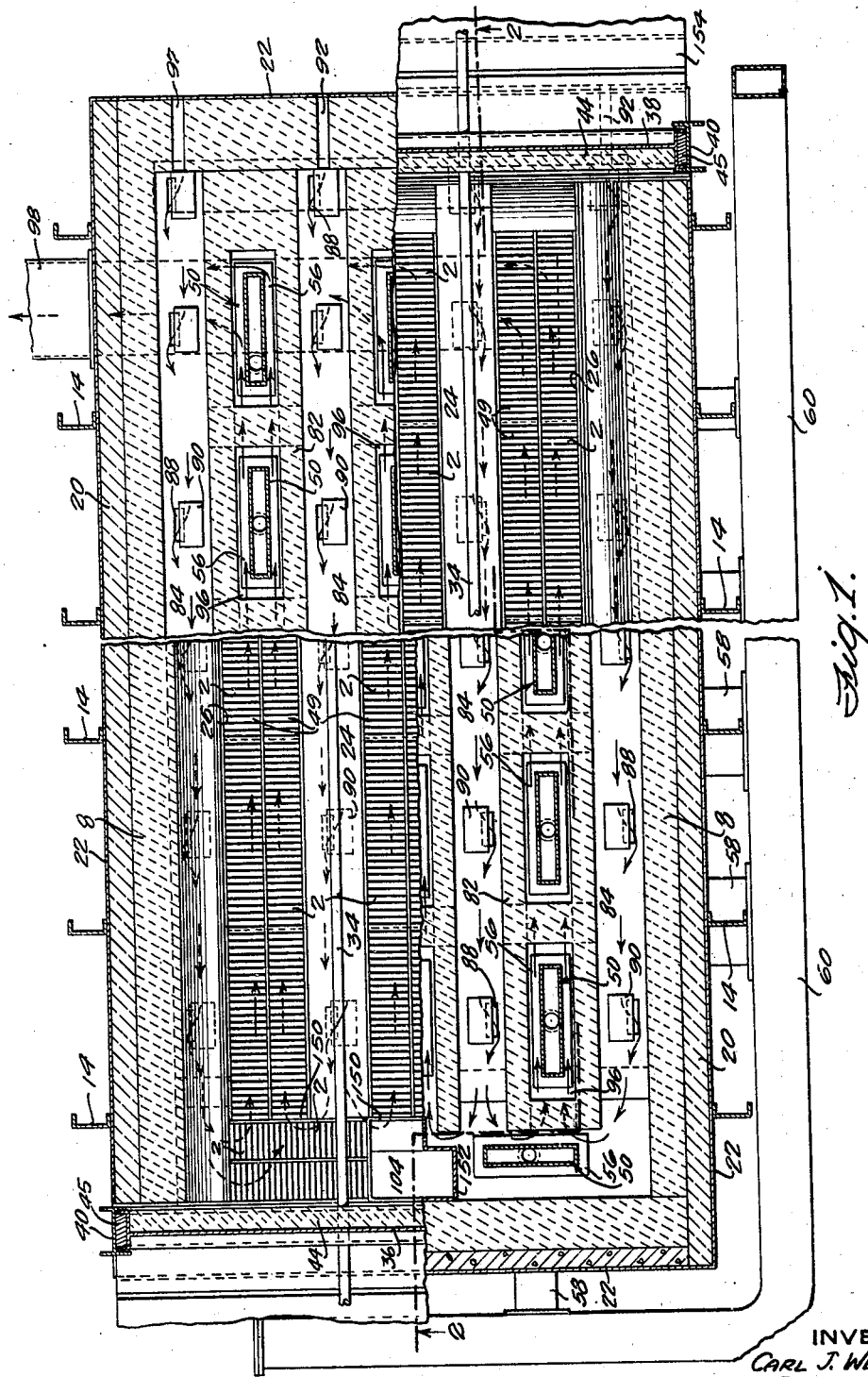
Figure 1 is a horizontal section through a reduction furnace embodying the present invention, this section being taken generally on the line 1—1 of Figure 2, but showing the hearth broken away both in the upper right hand corner of the figure and also in the lower left hand corner in order to illustrate better the circulation of the air and gases.

In the illustrative reduction furnace, which has particularly been designed to practice the novel processes of facilitating and controlling chemical reactions and physical treatments which are described and claimed in the U. S. application of James C. Hartley, Serial No. 338,560, filed June 3, 1940, and in the U. S. application of H. A. Brassert and James C. Hartley, Serial No. 360,418, filed October 9, 1940, the general purpose is to obtain and maintain the desired temperature conditions throughout the furnace, and particularly in the reduction zone, with the most economical use both of the fuel for producing the desired temperature conditions and of the reducing reagents themselves, to maintain the furnace in effective operative condition and also to provide for the convenient repair and replacement of parts subject to wear or deterioration.

As herein illustrated, the hearths 2 upon which the finely divided ore 4, or other finely divided metallic compound, is supported while undergoing the reduction or other treatment, are located in a common reaction chamber 6, there being shown altogether in the illustrative embodiment six of these hearths 2 arranged in pairs, these hearths each extending substantially throughout the length of the reaction chamber 6.

The furnace as a whole is preferably formed of refractory material, such as fire brick, and the reaction chamber 6 is provided with side walls 8 and an arched top wall 10 of refractory brick, preferably of a somewhat heat insulating type, the lateral support of the arched top wall 10 being reinforced by horizontal channel bars 12 backed up by vertical channel bars 14, constituting, with the top channel bars 16 and bottom channel bars 18, a supporting frame for the entire furnace structure. Surrounding this refractory brick structure, of which the furnace as a whole consists, is preferably a layer of insulation 20 which may be of any suitable character, such, for example, as the magnesia or asbestos insulations now employed outside refractory brick furnace walls, the particular type of insulation depending upon the insulating character of the refractory brick of which the furnace walls themselves are composed. Surrounding the entire structure, for the purpose of reinforcing, confining and protecting the insulating and refractory materials, is preferably a steel casing 22.

As above stated, in the illustrative embodiment of the invention, six reducing hearths 2 are shown, these hearths being arranged in pairs and the pairs being separated by partition members 24 of refractory material, preferably having vertical sides. The reducing compartments thus defined between the vertical portions 26 of the side walls 8 and the opposed vertical sides of the partition members 24, and between the two partition members 24 themselves, are preferably lined with heat-resisting steel 28. The sections of heat-resisting steel 28 which cover the refractory partition members 24 are preferably integral extensions of the manifolds hereinafter to be described and each is formed with an upturned flange 30 to receive between it and the flange of the section 28 in the next compartment a rib 32 on a tube 34 extending throughout the length of each of the partition members 24 for a purpose presently to be described.

Figure 2:
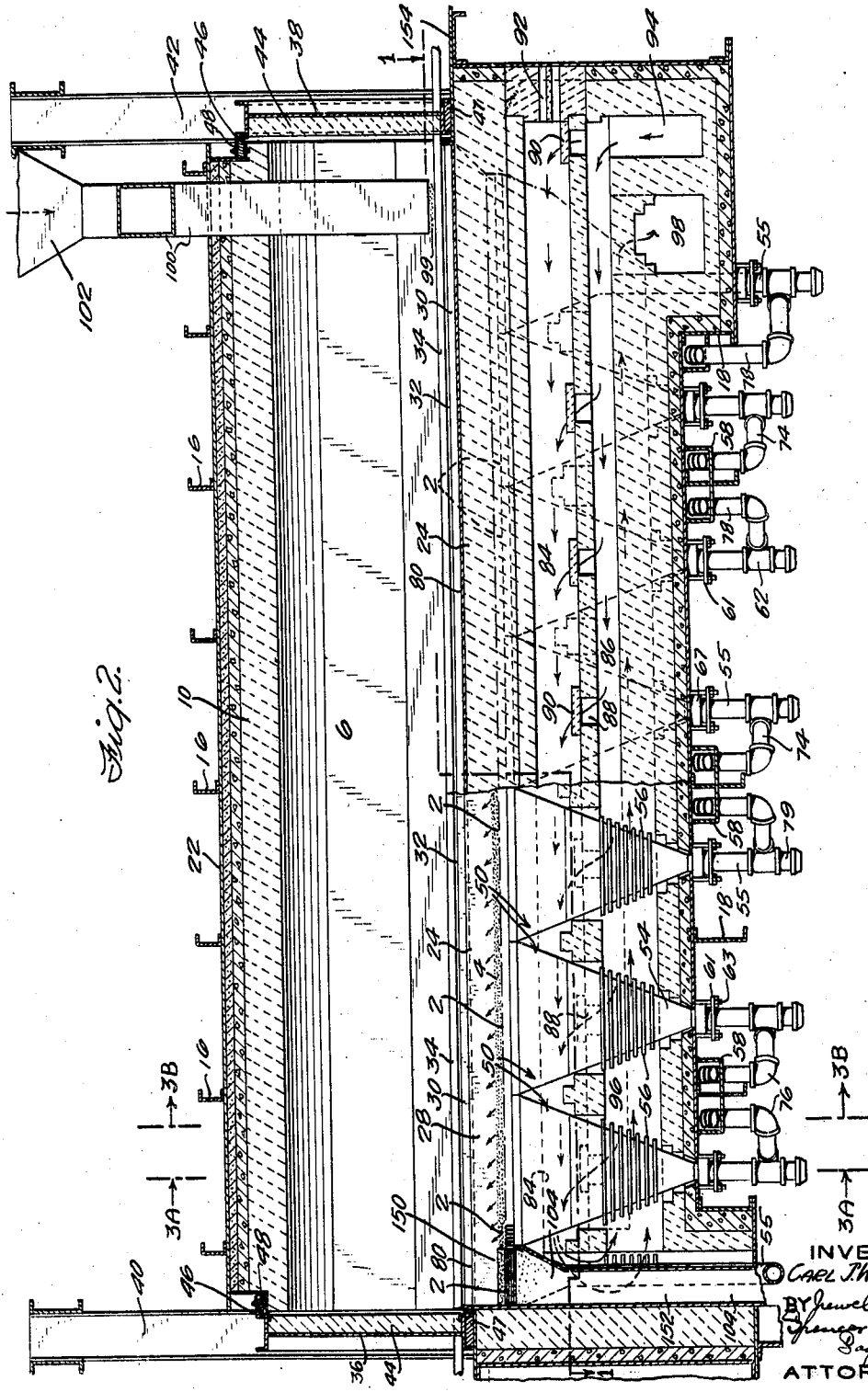
Figure 2 is a section generally on the line 2—2 of Figure 1, the section shown in the left hand half of Figure 2 being also indicated by the section line 2—2 of Figure 3.

As hereinabove pointed out, one of the important features of the present invention is to provide for the ready removal from the furnace for replacement, repair or cleaning of those parts which are subject to wear or abrasion or possible accumulations of foreign matter or to deterioration or destruction from continued exposure to high temperatures. To this end the hearth construction is made up of sections 49 arranged for ready removal and the reaction chamber 6 is provided with closures at its two ends for ready access thereto to permit such removal and to provide for cleaning of the reaction chamber and for such manual control of the operations as may occasionally be necessary. As shown in Figure 2 of the drawings, the side walls 8 do not extend over the two ends of the reaction chamber 6, these ends being, instead, closed by doors 36 and 38, movable vertically in guides 40 and 42 in the furnace supporting and reinforcing frame. As shown, the doors 36 and 38 are each lined with refractory material 44 and each is provided with a bevelled gasket 46 of refractory material that engages a correspondingly bevelled refractory 48 so that as the door is moved into closed position it automatically effects a gas-tight sealing of the closure. The doors 36 and 38 are preferably also of slightly trapezoidal or keystone outline so that the inclined side edges may seek a gas tight seat in packing 45 in the lower parts of the guides 40 and 42. The bottom edges of the doors 36 and 38 also come into gas tight engagement with packing 47 at the end of their downward travel.

Figure 3:
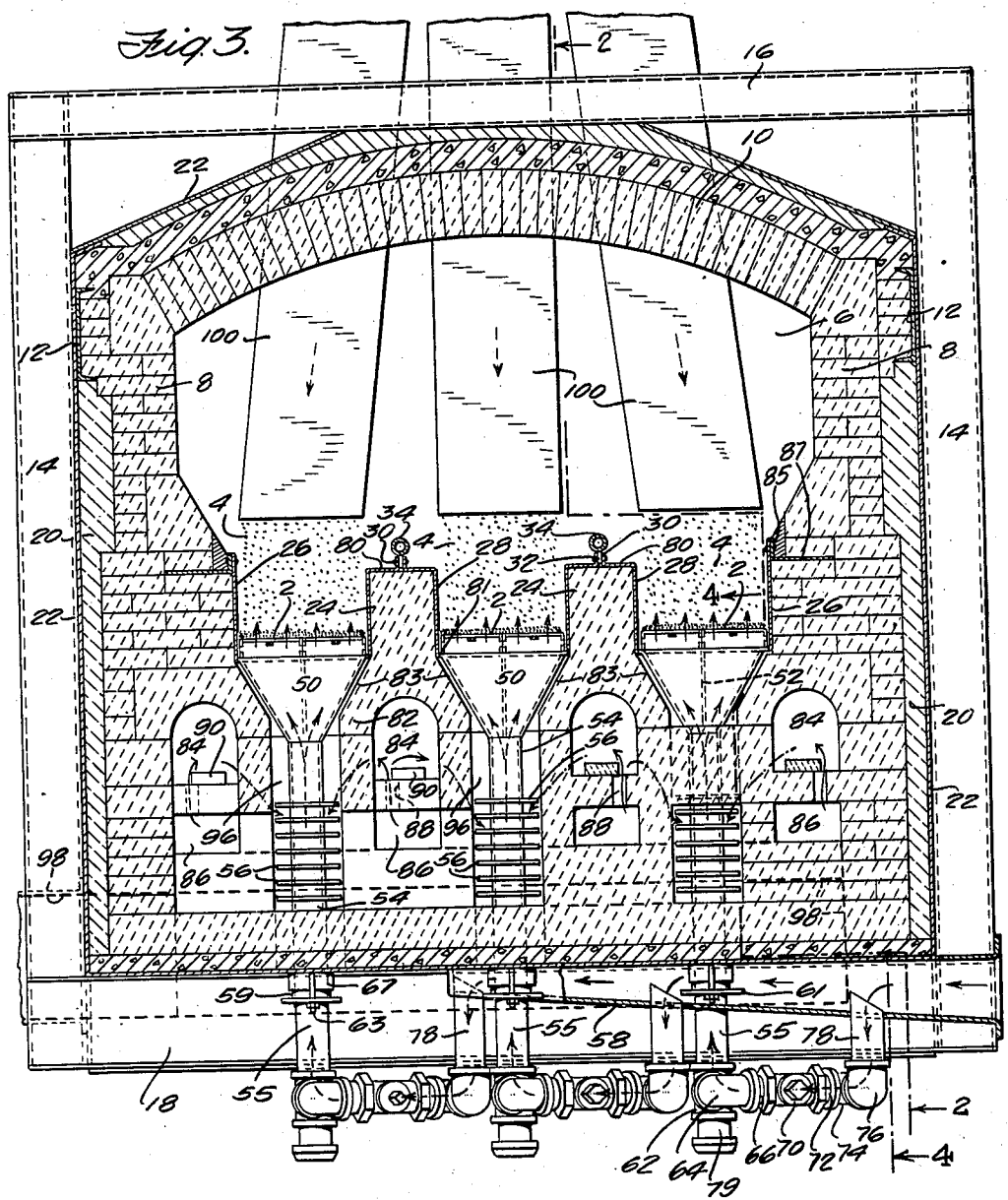
Figure 3 is a section on the lines 3A—3A and 3B—3B of Figure 2, the left hand half of Figure 3 being a section on the line 3A—3A of Figure 2 and the right hand half of Figure 3 being a section on the line 3B—3B of Figure 2.

As shown in Figures 1, 2 and 3, the respective hearths 2 are made up of removable sections 49 each supplied with reducing gas by a manifold 50. Each of the manifolds 50 has therein a central partition member 52 which serves to divide it centrally into two manifolds each supplying a section of a pair of correspondingly located sections of one of the pairs of hearths 2.

As shown, the reducing gas manifolds, which are indicated generally by the reference numeral 50, are of the shape of an inverted frustum of a pyramid in their upper portions, each tapering downwardly on all four sides from its hearth-supporting upper end to its junction with a part 54 thereof which continues the taper in one dimension but maintains its other dimension uniform and relatively narrow down to its connection with the supply pipe 55, so that the side faces of the lower part of each manifold 50 form like parallel trapezoids. The part 54 of the manifold 50 is provided on its parallel faces with heat-absorbing ribs 56 to increase the absorption of heat from the hot combustion products which are employed to preheat the reducing gases. These ribs may also extend as shown across the narrow inclined sides of the part 54.

The manifolds 50 for any group of six correspondingly located removable hearth sections 49 across the furnace are themselves supplied with reducing gas from a cross manifold 58 which in turn is supplied from a longitudinal manifold 60.

As shown in Figure 4 of the drawings, the connection between the supply pipe 55 and the lower part 54 of the manifold 50 is such as to permit the ready withdrawal of the manifold 50 for replacement or repair or cleaning. This connection is shown as comprising a nipple extension 57 on the part 54 of the manifold 50. This nipple 57 approximately abuts the upper end of the supply pipe 55 within a collar 59 surrounding the upper end of the supply pipe 55 and connected thereto, said collar 59 having a flange 61 to receive threaded studs 63, connected to the lower part of the casing 22, so that the collar 59 may serve as the gland for compressing the packing 65 in a stuffing box 67 to insure a gas tight connection between the supply pipe 55 and the nipple 57.

The connections between the cross manifold 58 and the supply pipes 55 are such as to permit expansion of the connections without disturbing the connection between the supply pipes 55 and the manifolds 50. As shown particularly in Figures 4 and 5, the vertical supply pipe 55, which is connected to the manifold 50 in the manner hereinabove described is connected at its other end to a T 62 which in turn is connected by an elbow 64 and a nipple 66 to a section 68 having therein a valve 70, this section 68 being connected at its other end by a nipple 72 to an elbow 74 connected to a second elbow 76 which in turn is connected by a short pipe section 78 with the manifold 58. A capped extension nipple 79 on the lower end of the T 62 may have its cap removed to permit cleaning of the vertical supply pipe 55 and manifold 50.

Each of the manifolds 50 is supported in the furnace structure, as shown, by engagement of the horizontally turned part 80 of its side extension 28 with the top of the partition member 24. A shoulder 81 provided at the junction of the extension 28 with the side wall proper of the manifold 50 provides a supporting seat for the hearth section 49. The outer side extensions 28 of the manifolds 50 for the outside pairs of hearths 2 are shown as attached by rivets or otherwise to flanges 85 on metal plates 87 set into the side walls 8. Each of the manifolds is bodily removable as hereinafter more fully set forth.

Refractory columns 82 and also the side walls of the main furnace structure have inclined surfaces 83 parallel and closely adjacent to the side walls of the upper parts of the manifolds and these form also a part of the outer faces of the walls of combustion chambers 84 located both in the columns 82 and in the side walls of the furnace structure. Below the combustion chambers 84 are flues 86 for hot air. The flues 86 have, at intervals, connections 88 with the combustion chambers 84 to supply air for combustion of fuel introduced into the chambers 84, the amount of air to be admitted to provide for the desired eventually complete combustion being determined by valve blocks 90 in the combustion chambers 84 which are slidable over the floors of the combustion chambers to open or close more or less of the communicating openings 88.

As shown in Figure 3, there are four combustion chambers 84 extending substantially throughout the length of the reduction furnace and four corresponding hot air flues. The gaseous or vaporized fuel to be burned in the combustion chambers 84 is introduced thereinto through burner openings 92 in the right hand end thereof, as shown in Figures 1 and 2, and the hot air to supply the necessary oxygen for combustion is supplied to the longitudinal air flues 86 by means of a cross flue 94 having manifold connections with the longitudinal flues 86, the cross flue 94 being in turn supplied with hot air under some pressure from any suitable air preheating apparatus such as a recuperator or a regenerator. The recuperator or the regenerator may in turn be heated or partly heated by the waste gases from the combustion chambers 84 after they have been utilized to preheat the reducing gases or it may be heated by the gaseous products of the reduction operation or in any other suitable manner well known to the art.

As herein shown, and particularly in Figure 3 of the drawings, the air from the hot air flues 86 is introduced into the combustion chambers 84 at one side of the center thereof or near one wall thereof so as to set up a whirling motion of the burning gases in the flues 84, thus providing for the necessary turbulence and surface wiping action to insure maximum transfer of the heat produced by the combustion to the walls of the combustion chambers. Furthermore, as shown particularly in Figure 2, the hot air is not introduced into the combustion chamber 84 all at one point but is introduced at different points 88 along the length of each of the combustion chambers so that eventually complete combustion of the combustible constituents of the fuel is insured and more uniform distribution of the radiant and convection heat is effected.

As shown particularly in Figure 3, the lower ribbed ends of the manifolds 50 and a large part of the connecting pipes 54, with their heat-absorbing ribs 56, are located in flues 96 which are located between the combustion chambers 84 and into which the products of the combustion in the chamers 84 are discharged at the left hand ends of said chambers 84, as shown in Figure 2. These hot products of combustion, after discharge from the combustion chambers 84 traverse the entire lengths of the flues 96 in constant heat-transfer relation to the parts 50, 54 and 56, located therein, until they are discharged into the waste flue 98 at the right hand end of the furnace structure, as shown in Figure 2 of the drawings, from which waste flue 98 they may enter a recuperator, regenerator or stack, as desired.

The finely divided ore 99 or other finely divided metallic compound to be reduced or otherwise treated upon the hearths 2 is charged upon the hearths 2 through chutes 100 connected with a hopper 102 or other source of ore supply in any suitable manner. The ore, after being reduced or treated upon the hearths 2, is discharged into a common discharge chute 104 in a manner hereinafter to be more fully set forth.

As hereinabove pointed out, each of the hearths 2 is made up of removable sections 49 each supplied with reducing gases by its half of one of the manifolds 50. The removable hearth sections 49 are in turn each made up of a plurality of individual members or tiles so fastened together as to form a unitary removable hearth section while at the same time providing the desired jet apertures in the hearth for the reducing gases.

Two forms of hearth construction are shown in Figures 7 to 13 inclusive. In Figures 7, 8 and 9 is shown a hearth construction in which the individual members that go to make up the removable hearth section are formed of some heat-resisting metal alloy such as a 25–20 chrome-nickel-steel alloy.

In the form of hearth construction shown in Figures 7 to 9 inclusive, cross members 106 of the chrome-nickel-steel, or other suitable heat-resisting alloy, are formed with a main wall or partition portion having at its ends tongues 108 arranged to fit into corresponding slots 110 in side bars 112. The upper edges of the members 106 are bent over to form lips 114 which together form the ore-supporting surface of the hearth. At their left hand or free edges, as shown in Figure 9, the lips 114 are bevelled as at 116 so that when the bevelled edge of one lip is brought into juxtaposition to the rounded shoulder 118 formed by the bend producing the lip of an adjacent member, and slightly spaced therefrom, a suitable jet opening 120 is provided between the succeeding members 106, the larger space below the jet openings 120 between the main wall portions of the members 106 providing for ready passage of the reducing gases to the relatively short passage constituting the jet opening 120. Since the hearth sections are preferably of substantial width, for example 8½ inches, so that a jet orifice extending from one side of a hearth section to another might be 8 inches long, it is preferable, to avoid a warping that might cause variation in the widths of the jet orifices, to reinforce the structure midway between the two sides. To this end each of the members 106 is provided with a notch 122, preferably extending to the upper surface of the lip 114, in which a spacing bar 124 may be located to insure maintenance of the proper dimensions of the orifice 120.

From the foregoing description, it will be seen that the hearth section, made up of the members 106, may be assembled by inserting the tongues 108 in the slots 110 provided in the side bars 112 and by locating the reinforcing bar 124 in the notches 122 of the members 106 and then welding all of the parts together to hold them in their definite relations to each other.

In the form of hearth section shown in Figures 10 to 13 inclusive, molded refractory tiles are employed instead of the metal alloy members. As shown particularly in Figure 13 of the drawings, each of these tiles is molded with a wall or partition portion 126, spacing and reinforcing ribs 128, interlocking tongues 130 and notches 132, and an upper lip 134 which forms the ore-supporting hearth surface. This lip 134, like the corresponding lip 114 of the metal alloy member has a bevelled edge 136 which is shown as spaced slightly behind ribs 128 and slightly behind the end spacers or side members 138 so that when it is thus brought into approximate juxtaposition to the shoulder 140, when the tiles are brought into interlocking relation to each other, a jet orifice 142 will be provided between the successive tiles 126.

Each of the tiles 126 has in its upper and lower edges at each end a notch 143 to receive a tie wire 144 by which a series of tiles may be tied together to form a hearth section. It will be seen that the arrangement of the tongues 130 and the notches 132 is such that when a series of tiles is tied together by the wires 144 as shown in Figure 12, the tiles are held both against displacement lengthwise with respect to each other and also against displacement vertically with respect to each other, the latter being a particularly important consideration in connection with the maintenance of the jet orifice dimensions.

To provide for reception of the twisted end 146 of the wire 144 when the section is assembled, a special end tile may be provided having therein a recess 148 and not having a tongue 130. This will permit adjacent sections 49 of the hearth to be brought into close abutting relation to each other. This special end tile should preferably be of metal, such as chrome nickel steel, to prevent injury from the tie wires 144.

Each of the pairs of hearths 2 has at its discharge end a dam or weir 150 of a height to maintain the desired depth of ore upon the hearth and the reduced ore or powdered metal resulting from the deduction operation is discharged over the top of the dam or weir into a common discharge chute 152. In order to avoid the necessity for a wide hopperlike upper end of the common chute 152 for the three pairs of hearths 2, the outside pairs of hearths 2 may be provided each with an extra section arranged to carry the reduced ore toward the point of discharge of the middle pair of hearths 2.

As shown in Figure 2 of the drawings, the middle pair of hearths 2 is provided with seven manifolds 50, each manifold being divided into two parts at its upper end to supply reducing gases to two hearth sections arranged side by side. Furthermore, to provide for more uniform distribution of the reduction gases to the individual jet orifices throughout the length of each hearth section 49, each of the manifold passages formed by the partition member 52 is divided into a plurality of smaller manifold passages by transverse partition members 153, thereby providing for distribution of the reducing gases to each of a plurality of smaller groups of jet orifices.

The outside pairs of hearths 2 will each be provided with eight of the manifolds 50 and will be made up of eight pairs of hearth sections 49 arranged above the said manifolds 50. As shown in Figure 2, the end manifolds 50 at the discharge ends of the outside pairs of hearths 2 are arranged at right angles to the position of the other manifolds 50 of said outside hearths and the eighth or end pairs of hearth sections 49 are likewise arranged at right angles to the other hearth sections of said outside hearths so as to deliver the reduced ore into the chute 152 near the same point at which delivery into the chute 152 is effected by the middle pair of hearths 2. The end sections of outside pairs of hearths 2 are, however, preferably inclined somewhat, as shown, toward their points of discharge to provide for more rapid movement of the ore over the additional hearth sections.

The tubes 34, hereinabove referred to, extend not only throughout the lengths of the partition members 24, but also outside the furnace so that they may serve as supports and guides for tools such as rakes or rabbles for use in effecting such manual or mechanical manipulation of the ore charge as may at times become necessary, these tubes being kept cooled sufficiently to prevent injury thereto by the heat and gases by circulating water therethrough in any suitable manner. A shelf or ledge 154 is preferably provided outside each of the doors 36 and 38.

In the modification of the combustion chamber construction shown in Figure 6 of the drawings, provision is made for bringing the heat of the combustion taking place in the chambers nearer to the compartments formed between the partition members 24 and between said members and the side walls, where it is found to be desirable to have more immediate conduction of heat to the ore charge upon the hearths 2. As shown in Figure 6, each of the combustion chambers 84 is provided with an upward extension 156 into the partition members 24 and also with a corresponding upward extension 156 into the parts of the side walls which are adjacent to the compartments in which the ore is reduced.

From the foregoing description, it will be seen that a compact, durable and easily repairable reduction furnace construction has been provided in which the desired physical conditions for the reduction operations can be obtained and maintained and which has capacity for producing and delivering in condition for immediate use commercial quantities of powdered metal.

In operation, the furnace doors 36 and 38 having been closed, the furnace will preferably be heated up to a temperature approximating the temperature at which the reduction takes place before any ore is charged upon the hearths 2. This preheating can be brought about by burning a fuel, such as gas, in the combustion chambers 84, the gas being introduced through the burner openings 92 and the air being introduced into the combustion chambers 84 from the flues 86 through the air inlets 88 and being preferably preheated. Additional heat may be supplied to the reduction chamber 6 by blowing hot air through the manifolds 50, this air also picking up some of the heat from the combustion gases as they pass over the ribs 56 on the parts 54 of the manifolds 50.

The reaction chamber 6 and the hearths 2 having been raised to the proper temperature to start the reduction, a reducing gas or gases is introduced into the reaction chamber 6 through the manifolds 50 and orifices 118 or 142 until the air has been displaced from the reaction chamber 2, when the finely divided ore 4 may be charged upon the right hand end of the hearths 2 through the chutes 100. This ore may be preheated in any suitable manner but need not necessarily be preheated if sufficient length of hearth is provided.

As the ore is charged upon the right hand end of each of the hearths 2, the reduction gases forced through the orifices 118 or 142, according as a metallic or a refractory hearth is employed, thoroughly permeate and render fluent the finely divided ore so that it tends to flow across the hearths 2 at the same time that its particles are brought into intimate reactive relation to the reducing gases and thoroughly agitated thereby. As herein shown, the orifices 118 or 140 are preferably so directed that they also tend to effect a movement of the particles of the finely divided ore toward the discharge ends of the hearths.

As hereinabove pointed out, the reduction gases as they pass up through the ribbed narrow sections 54 of the manifolds 50 become thoroughly heated by the products of the combustion which takes place in the combustion chambers 84 so that they assist in raising the ore 4 upon the hearths 2 to the proper reaction temperature. Furthermore, the combustion which is taking place in the combustion chambers 84 keeps the whole furnace structure in the region of the hearths at the desired reaction temperature, both radiant heat of the combustion and convection heat being taken up to a considerable extent by the walls of the combustion chamber 84 and conducted through these walls to the parts adjacent thereto.

It will further be noted that by reason of the hopper-like construction of the manifolds 50 any ore fines or other dust that may enter the hoppers 50, as, for example, by dropping through the slots in the hearth, will be directed into the supply pipes 55 and on into the extension nipples 79 which are in axial alignment with the pipes 55, these nipples constituting dust traps having their bottoms constituted by removable caps. It will also be noted that the gas which comes to the supply pipes 55 from the manifolds 58 enters the supply pipes 55 at right angles to the axis thereof and, therefore, any dust which may chance to be entrained in the entering gas will tend to be caught in the dust trap 79, either by reason of the enforced sharp change in direction of the gas, which will permit the entrained dust to drop away from it, or by reason of the slowing up of the gas as it enters a passage of greater cross section in the manifold 50.

What is claimed as new is:

1. A reduction furnace comprising, in combination, refractory walls defining a reaction chamber having an access opening, a closure for said opening, a hearth in said chamber provided with jet orifices through which reducing gases may be so forced as to cause them to permeate, render fluent and react with the particles of a finely divided ore or other metallic compound charged upon said hearth, said hearth being divided lengthwise into a plurality of sections each removable bodily through said access opening and each provided with a plurality of jet orifices, and manifolds for the respective removable hearth sections for supplying reducing gases to the jet orifices thereof.

2. A reduction furnace according to claim 1 in which the hearth section manifolds are also bodily removable individually through said access opening.

3. A reduction furnace according to claim 1 in which the reaction chamber is elongated to provide for a hearth relatively long in proportion to its width and is provided with an access opening and a closure therefor at each end.

4. A reduction furnace according to claim 1 in which the wall structure defining the reaction chamber comprises walls for laterally confining upon the hearth to a substantial depth the finely divided ore to be reduced and in which combustion chambers are provided in the aforementioned ore confining walls to impart heat thereto.

5. A reduction furnace according to claim 1 in which refractory walls also define a flue beneath and extending lengthwise of the hearth into which the individual manifolds for the hearth sections project, provision being also made for directing hot gaseous products of combustion through said flue to effect preheating of the reduction gases in said manifolds.

6. A reduction furnace according to claim 1 in which the manifold for a hearth section tapers gradually from a dimension which is coextensive with the length of a removable hearth section of substantial length to a dimension which corresponds to an ordinary pipe size and is provided on the trapezoidal sides thus formed with heat-absorbing ribs.

7. A reduction furnace according to claim 1 in which the hearth section manifold comprises a portion relatively narrow in proportion to its average lateral dimensions, has trapezoidal sides exposed to hot gaseous products of combustion and also comprises a frusto-pyramidal portion between the narrow portion and the hearth section.

8. A reduction furnace according to claim 1 in which water-cooled guides are supported on the lateral hearth confining walls in position to guide the movements of ore manipulating tools over the hearths.

9. A reduction furnace according to claim 1 in which the manifolds for the respective removable hearth sections are each divided in the greater hearth-serving dimension to direct the reducing gases to a pair of removable hearth sections arranged side by side and are further divided transversely to direct the reducing gases to smaller groups of jet orifices in each removable hearth section.

10. A reduction furnace according to claim 1 in which three separate hearth compartments are arranged side by side and in which the hearths in the lateral compartments have at their ends transversely extending sections delivering the reduced ore to substantially the point of discharge of the intermediate hearth.

11. A reduction furnace according to claim 1 in which hopper-like manifolds have tubular gas connections thereto and are each provided in said connections with a dust trap arranged vertically beneath the hopper and below the gas intake to receive dust and ore particles falling through said hopper, the bottom of said dust trap being constituted by a removable closure.

CARL J. WESTLING.